United States Patent
Singh et al.

(10) Patent No.: US 12,074,807 B2
(45) Date of Patent: Aug. 27, 2024

(54) DETECTING SHORTFALLS IN AN AGREEMENT BETWEEN A PUBLISHER AND A SUBSCRIBER

(71) Applicant: Ciena Corporation, Hanover, MD (US)

(72) Inventors: Ekta Singh, New Delhi (IN); Nikhil Gupta, Bathinda (IN); Preet Bhansali, Gurgaon (IN); David Jeffrey Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/962,623

(22) Filed: Oct. 10, 2022

(65) Prior Publication Data

US 2024/0073156 A1 Feb. 29, 2024

(30) Foreign Application Priority Data

Aug. 26, 2022 (IN) .............................. 202211048701

(51) Int. Cl.
*H04L 47/80* (2022.01)
*H04L 67/55* (2022.01)

(52) U.S. Cl.
CPC ............ *H04L 47/805* (2013.01); *H04L 67/55* (2022.05)

(58) Field of Classification Search
CPC ............. H04L 41/5009; H04L 41/5003; H04L 47/805; H04L 67/55
See application file for complete search history.

(56) References Cited

U.S. PATENT DOCUMENTS

| | | | |
|---|---|---|---|
| 7,995,569 B2 | 8/2011 | Ashwood-Smith et al. | |
| 8,364,036 B2 | 1/2013 | Boertjes et al. | |
| 9,060,215 B2 | 6/2015 | Miedema | |
| 9,258,190 B2 | 2/2016 | Swinkels et al. | |
| 9,509,434 B2 | 11/2016 | Swinkels et al. | |
| 9,686,176 B2 | 6/2017 | Traxler et al. | |
| 9,819,565 B2 | 11/2017 | Djukic et al. | |
| 10,440,128 B2 | 10/2019 | Miedema | |
| 10,797,818 B1 | 10/2020 | Croskery et al. | |
| 10,891,176 B1 | 1/2021 | Miedema | |
| 10,958,993 B2 | 3/2021 | Swinkels et al. | |
| 10,985,838 B1 | 4/2021 | Al Sayeed et al. | |
| 10,992,374 B1 | 4/2021 | Miedema et al. | |
| 11,303,541 B2 | 4/2022 | Miedema | |
| 11,356,325 B1 | 6/2022 | Miedema | |
| 2003/0046395 A1* | 3/2003 | Fleming ................ | G06F 9/542 709/226 |
| 2013/0179538 A1* | 7/2013 | Dutta ................ | H04L 43/0817 709/217 |
| 2015/0195368 A1* | 7/2015 | Bandyopadhyay ........................ | H04L 43/0805 709/219 |

(Continued)

*Primary Examiner* — Jeong S Park
(74) *Attorney, Agent, or Firm* — Baratta Law PLLC; Lawrence A. Baratta, Jr.

(57) ABSTRACT

Systems and methods are provided for detecting a shortfall condition with respect to a subscription agreement between a publisher and a subscriber, particularly in a network environment. A method, according to one implementation, includes the steps of examining measurable aspects of real-world subscription events between a publisher and a subscriber in a distributed system. The method also includes the step of comparing the measurable aspects with a subscription agreement between the publisher and the subscriber to determine if there is a shortfall with respect to the subscription agreement.

19 Claims, 8 Drawing Sheets

(56) References Cited

U.S. PATENT DOCUMENTS

| | | |
|---|---|---|
| 2016/0050470 A1 | 2/2016 | Swinkels et al. |
| 2016/0072575 A1 | 3/2016 | Al Sayeed et al. |
| 2019/0349262 A1 | 11/2019 | Miedema et al. |
| 2020/0374181 A1* | 11/2020 | Stenberg ............... H04W 48/18 |
| 2021/0042172 A1 | 2/2021 | Miedema et al. |
| 2021/0042173 A1 | 2/2021 | Prakash et al. |
| 2021/0075877 A1 | 3/2021 | Miedema et al. |
| 2021/0409271 A1* | 12/2021 | Jacob Da Silva .. H04L 41/0866 |
| 2022/0075674 A1 | 3/2022 | Miedema et al. |
| 2022/0103417 A1* | 3/2022 | Grammel .............. H04L 41/069 |
| 2022/0231929 A1* | 7/2022 | Li ....................... H04L 41/0806 |
| 2022/0256263 A1 | 8/2022 | Al Sayeed et al. |
| 2023/0022048 A1* | 1/2023 | Miedema ............ H04L 41/5019 |
| 2023/0261925 A1* | 8/2023 | Vaishnavi ........... H04L 41/5067 |
| | | 709/223 |

* cited by examiner

| RAISE-SOAK TIMER EXPIRES | TIME INTERVAL OF PUBLISHER A (AGREED-UPON INTERVAL: 10 sec) | TIME INTERVAL OF PUBLISHER B (AGREED-UPON INTERVAL: 30 sec) | NOTES |
|---|---|---|---|
| 1ST TIME | 20 | 60 | Alarm Raised |
| 2ND TIME | 30 | 90 | |
| 3RD TIME | 40 | 120 | |

DETECTING SHORTFALLS IN AN AGREEMENT BETWEEN A PUBLISHER AND A SUBSCRIBER

TECHNICAL FIELD

The present disclosure generally relates to networking systems and methods. More particularly, the present disclosure relates to detecting shortfall conditions with respect to agreements between publishers and subscribers based on changes in a distributed system and thereby adapting telemetry streams in response to these shortfalls.

BACKGROUND

In a distributed system (or network), certain network devices, such as Network Elements (NEs), may include publishers that are configured to periodically publish data that is provided to subscribers according to a predetermined subscription agreement between the publishers and subscribers. For example, the NEs may obtain Performance Monitoring (PM) data, which may be related to operating metrics of the distributed system, and then periodically push this PM data to the subscribers, which can then use the information for various purposes. The transmission of the PM data or other similar types of information packets can be executed by telemetry streams from the publishers to the subscribers.

According to typical telemetry streaming techniques, the predetermined subscription agreements may be based on various assumptions about the distributed system (or network). However, when the distributed system undergoes certain changes, such as the addition of more publishers or subscribers, it may become difficult to guarantee the original subscription agreements. Also, many conventional systems do not allow any type of recalibration of the original subscription agreements, which can lead to missed packets and unacceptable telemetry streaming results.

In particular, performance of telemetry streaming can be affected by the number of clients (e.g., subscribers) connected, the number of subscriptions per client, the data format used for encoding the subscriptions, the amount of data published, the resources available for publishing, communications (comms) bandwidth needed to send the data, available CPU and/or memory resources of the publishers for collecting and reporting the data, among other things.

Normally, a worst-case configuration may be predicted before the deployment of network equipment in the distributed system. This worst-case scenario can be tested and verified in the lab. However, this process assumes that the worst-case number of resources is fixed and capped, that software changes will not affect performance from release to release, that the number of subscribers (clients) is well-known and controlled, that the system resources are well-known and will not change due to external events (e.g., changes in the comms bandwidth), that file transfers occupying comms bandwidth are only so large, that configurations in the field unable to be tested in the lab will not arise (e.g., a large number of passthrough nodes that are too expensive to test in lab conditions), and other assumptions.

However, these assumptions often do not account for the scaling of distributed systems and networks. Therefore, there is need in the field of telemetry streaming and subscription agreements to be able to scale with a network and make reasonable changes to the equipment and subscription agreements over time to account for network changes. Particularly, the conventional systems may experience certain shortcomings since the typical approach of testing a worst-case scenario in a lab before going to the field assumes a great deal about the future success of path testing.

There are many dimensions to this pre-planned assumption problem that cannot be controlled or tested. For example, it can be very difficult to know that any expected streaming configuration will always be able to be supported. Thus, there is a need to detect shortfall for any of these reasons and then report the condition to the distributed system. Also, as a result of detecting shortfalls, it would be advantageous, as defined in the present disclosure but absent from conventional systems, to adjust the streaming telemetry parameters of subscriptions as needed to account for changes in the distributed system.

BRIEF SUMMARY

The present disclosure is directed to systems, methods, computer-readable media, etc., for detecting when there is a shortfall in a subscription arrangement between a publisher and a subscriber. According to one implementation, a process for determining if there is a subscription shortfall, includes examining measurable aspects (e.g., time) of real-world subscription events between a publisher and a subscriber in a distributed system. The process further includes the step of comparing the measurable aspects with a subscription agreement between the publisher and the subscriber to determine if there is a shortfall with respect to the subscription agreement.

In some embodiments, the measurable aspects described in the process may include time interval calculations between consecutive publishing events, where the time interval calculations may be based on timestamps recorded at each publishing event. The publisher may be configured on a Network Element (NE) in the distributed system. The process may further include the step of obtaining a) one or more of Performance Monitoring (PM) data related to the distributed system, CPU usage characteristics of the NE and YANG data, b) stream telemetry data associated with the one or more of PM data, CPU usage characteristics and YANG data from the publisher of the NE to the subscriber of a Software-Defined Networking (SDN) controller of a Network Monitoring System (NMS), and/or other network metrics. The streamed telemetry data may be described using a structured data modelling language (e.g., YANG). The step of comparing the measurable aspects with the subscription agreement may include the step of determining whether resources on the NE are sufficient to meet the subscription agreement within a predetermined retrieval time or are insufficient to meet the subscription agreement and are thereby responsible for causing a shortfall. The NE, in some embodiments, may be configured to consolidate publications from one or more nodes within the network to push to one or more subscribers.

According to some embodiments, the process may be executed on a Network Monitoring System (NMS) in the distributed system and the subscriber may be configured in a Software-Defined Networking (SDN) controller of the NMS. The step of comparing the measurable aspects with the subscription agreement may also include determining whether resources on the NMS are sufficient to meet the subscription agreement within a predetermined consuming time or are insufficient to meet the subscription agreement and are thereby responsible for causing a shortfall. The subscriber may be configured to receive telemetry data from the publisher, and the NMS may use the telemetry data for various purposes, such as for network automation, traffic optimization, troubleshooting, among other purposes.

A shortfall with respect to the subscription agreement may be caused, for example, by one or more changes in the distributed system, such as a) an addition of a new publisher, b) an addition of a new subscriber, c) an addition of a new subscription agreement, and/or other causes. The shortfall with respect to the subscription agreement may also be caused by a) an addition of a new node in the distributed system, b) additional resources to be monitored, c) software or firmware changes, d) a new service or microservice in the distributed system, e) a status of traffic channel conditions, and/or other causes.

The step of determining the shortfall may include calculating an arithmetic expression based on a measured time interval between consecutive publishing events and an agreed-upon time interval of the subscription agreement and determining when the arithmetic expression exceeds a benchmark value. In response to determining that there is a shortfall with respect to the subscription agreement over a predetermined soak period, the process may further include the step of one or more of raising an alarm, provide a notification, and raise a standing condition. In response to determining that there is a shortfall with respect to the subscription agreement, the process may further include the step of modifying the subscription agreement. For example, modifying the subscription agreement may include a) increasing the agreed-upon time interval, b) preventing the addition of new subscriptions, c) changing priority settings with respect to one or more publishers and/or one or more subscribers, d) discontinuing one or more subscriptions, and/or other internally or externally controlled actions.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
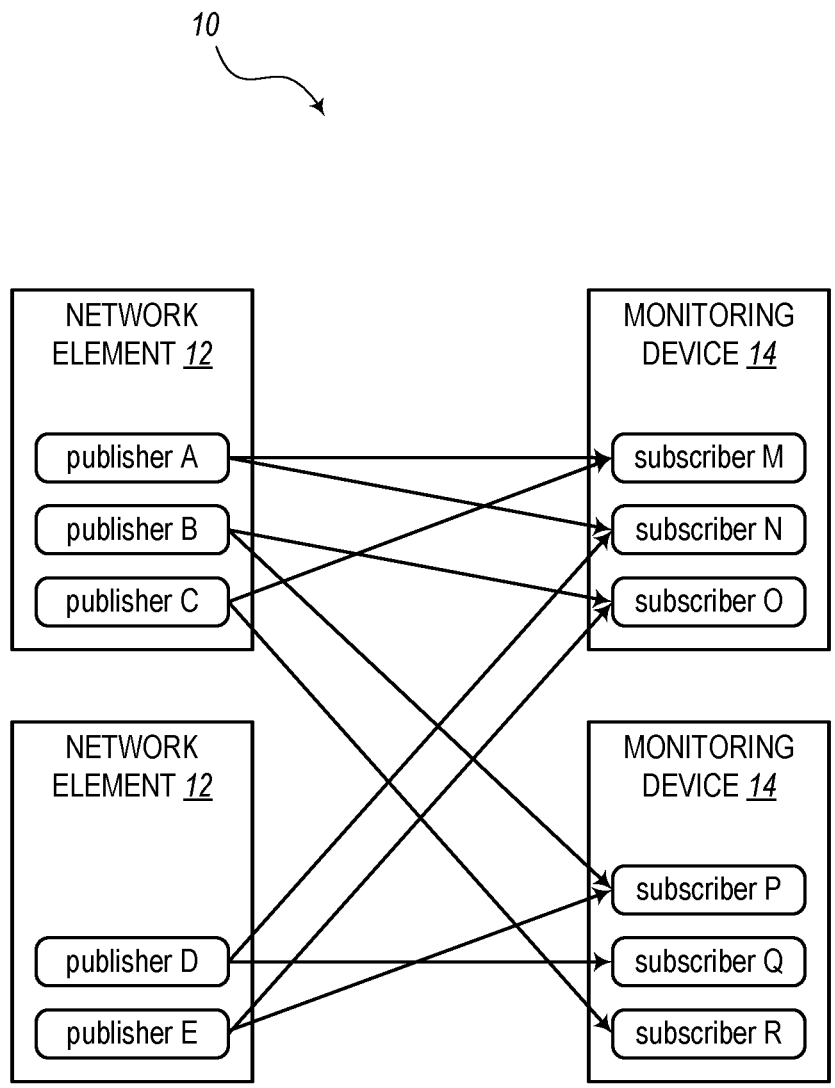
FIG. 1 is a block diagram illustrating a distributed system in which multiple publishers periodically publish telemetry data to multiple subscribers, according to various embodiments.

FIG. 1 is a block diagram illustrating an embodiment of a portion of a distributed system 10 (or network). As shown, the distributed system 10 include a plurality of Network Elements (NEs) 12 and one or more monitoring devices 14. For example, each NE 12 may represent a node, switch, router, Performance Monitoring (PM) sensor, etc. Also, each of the monitoring devices 14 may include, or may be part of, a Software-Defined Networking (SDN) controller, a Network Management System (NMS), an Operations, Administration, and Maintenance (OAM) system, a data center, or the like.

For simplicity, two NEs 12 and two monitoring devices 14 are shown in FIG. 1, but it should be understood that the distributed system 10 may include any number of NEs 12 and monitoring devices 14. One or more of the NEs 12 may include one or more publishers (e.g., publishers A, B, C, D, E) and one or more of the monitoring devices 14 may include one or more subscribers (e.g., subscribers M, N, O, P, Q, R). The publishers periodically publish (e.g., push, transmit) telemetry data to the multiple subscribers. In some embodiments, the publishers A, B, C, D, E, etc. may be entities on the NEs 12 that can periodically publish requested data to the subscribers M, N, O, P, Q, R, etc. The subscribers may be client applications running on network management software and may request or ask for certain data from certain publishers.

Streaming Telemetry Data

In particular, telemetry streaming is an approach for network monitoring in which data is continuously streamed from network devices (e.g., the NEs 12). The monitoring devices 14 (e.g., SDN controller of an NMS) can subscribe to the specific data items they need. The NEs 12 and monitoring devices 14 may use data models as a common structure and interface. Streaming telemetry therefore enables access to real-time, model-driven, and analytics-ready data that can help the monitoring devices 14 with network automation, traffic optimization, preventive troubleshooting, among other uses. For example, streaming telemetry can report in real time on packet drops or high utilization on links. This information can then be used by a network automation platform to provision new paths and optimize the traffic across the network. With streaming telemetry, the telemetry data can be described using any suitable structured data modelling language (e.g., YANG), can be encoded in JSON, XML, Google Protocol Buffers, or other suitable language, and then can be streamed over any suitable transmission protocols.

Since there are factors in streaming performance that cannot be tested in advance and in perpetuity, the distributed system 10, according to the embodiments of the present disclosure, is configured to detect conditions where the performance is falling behind. For example, one basic way to test for performance is to observe how well the actual publication events (e.g., the time interval between consecutive publication push events) are able to meet the requests. For example, the subscribers may wish to receive telemetry data (e.g., PM data) at time intervals of ten seconds apart. In other words, a subscriber may request to receive a publication at a frequency of one push event every ten seconds.

However, as suggested above, the distributed system 10 may experience changes (e.g., the addition of new NEs 12, packet routing changes, new services or microservices offered by the distributed system 10, the addition of new publishers, the addition of new subscribers, etc.). As a result, the actual time interval between publication events may be lengthened to a point where an NE 12 cannot keep up with an agreed-upon time interval. In some embodiments, the reasons for a shortfall can be monitored in some cases, if possible, although it may not be necessary with respect to many embodiments of the present disclosure. Suppose, for example, that a subscription has requested that something be published every X seconds, but the associated NE 12 can only be published, on average, every X+F seconds. In this situation, the value F can be considered to be the average shortfall. If, for one or more subscribers, F is greater than a predetermine threshold (or if it exceeds X by a certain percentage of X), a shortfall condition can be alarmed.

In some embodiments, one or more NEs 12 may be configured as a collector that collects telemetry data or PM data from one or more other NEs 12. In some cases, a NE 12 that was not originally designated as a collector can be later configured as a collector, such as when additional NEs 12 are deployed in the distributed system 10. In this case, a local shortfall may be 0, but the amount of data being published upstream to another NE 12 may be too great to meet the agreed-upon time interval. As such, the collector NE 12 may not be able to process the cumulative data within the given time parameters. This too might result in a shortfall.

According to various embodiments, a timestamp may be recorded every time a publication is transmitted (e.g., at the end of transmission). These timestamps may then be used to calculate the actual time intervals between consecutive (or successive) publications. In some situations, the timestamps on the publications may match the expected publication timestamps, but the publications may be queued in such a way that the collector is processing stale records due to the inability to keep up.

In either of these cases or according to other similar scenarios, a shortfall is detected. Conventional systems normally do not address this issue. However, the embodiments of the present disclosure are configured to not only detect when there is a shortfall, but also may take actions for handling any shortfalls. One way of handling a shortfall, for example, is to allow the distributed system 10 to apply an adjustment factor to the NEs 12 (e.g., nodes), externally or internally, and the monitoring devices 14.

Once an adjustment factor is applied, the distributed system 10 can respond accordingly. For example, based on provisioned client priority, the NEs 12 may be configured to suppress or reduce data going to low priority clients (e.g., monitoring devices 14). Based on provisioned subscriber priority (and/or a maximum duration), the monitoring devices 14 may be configured to scale provisioned "interval duration" parameters by a pro-rated factor so that high priority subscription attempts are intended to stay at the nominal publishing time interval while lower priority subscriptions can have the time interval between publications extended (e.g., up to a maximum time), at which time they can be dropped.

Each subscriber may be configured to report any adjusted time interval so that a user or system can determine the new publishing time interval. For instance, this reporting may be important if consumers are monitoring the stream performance and need to know why the publications are delayed (e.g., due to an intentional adjustment, due to traffic congestion, etc.).

While these subscriptions are being adjusted, when necessary, they continue to be monitored for new shortfalls. If another shortfall remains with respect to the new extended time interval, more adjustments can be made to increase the time interval even further. If the shortfall eventually goes away, the system can monitor the conditions to adjust the previously applied adjustments back to the original agreed-upon time interval (or an intermediate extended time interval) to try and recover the system gracefully. In some embodiments, this recovery process may be done slowly and with some hysteresis applied so as not to force the system to toggle back and forth between shortfall conditions.

General Network Device

Figure 2:
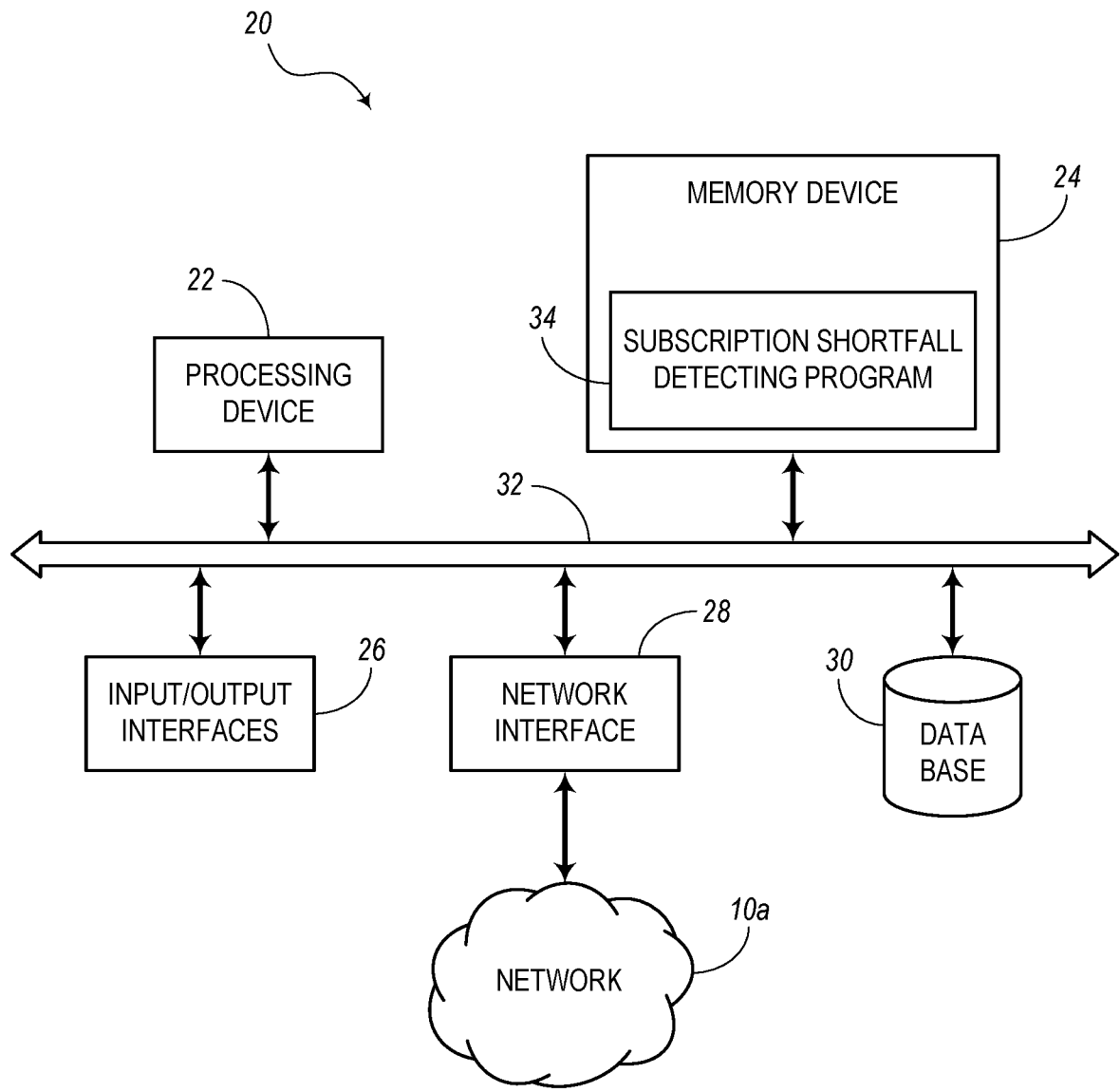
FIG. 2 is a block diagram illustrating a network device for detecting subscription shortfalls in a distributed system, according to various embodiments.

FIG. 2 is a block diagram illustrating an embodiment of a network device 20 for detecting subscription shortfalls in a network 10*a* or distributed system (e.g., distributed system 10). In some embodiments, the network device 20 may represent one or more of the NEs 12 or one or more publishers A, B, C, D, E shown in FIG. 1. In other embodiments, the network device 20 may represent one or more of the monitoring devices 14, a NMS, an OAM device, an SDN controller, etc.

In the illustrated embodiment, the network device 20 may be a digital computing device that generally includes a processing device 22, a memory device 24, Input/Output (I/O) interfaces 26, a network interface 28, and a database 30. It should be appreciated that FIG. 2 depicts the network device 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the network device 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the network device 20 and may include, for example, an internal hard drive connected to the local interface 32 in the network device 20. Additionally, in another embodiment, the data store may be located external to the network device 20 and may include, for example, an external hard drive connected to the Input/Output (I/O) interfaces 26 (e.g., SCSI or USB connection). In a further embodiment, the data store may be connected to the network device 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the network device 20 to communicate over a network, such as the distributed system 10, the network 10a, the Internet, a Wide Area Network (WAN), a Local Area Network (LAN), and the like. The network interface 28 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 10a.

Detecting Subscription Shortfall Conditions

The network device 20 further includes a subscription shortfall detecting program 34, which may be configured in any suitable combination of software/firmware and/or hardware. For example, the subscription shortfall detecting program 34 may be implemented in software or firmware in the memory device 24, as shown, or within any other suitable non-transitory computer-readable media and/or may be implemented in hardware in the processing device 22 or other hardware element. The subscription shortfall detecting program 34 may include computer logic, computer-readable instructions, programs, modules, routines, sub-routines, etc. and may be configured to enable or cause the processing device 22 to perform certain functionality related to the various processes, procedures, and techniques described herein with respect to detecting shortfalls in the transmission and/or reception of publications, by either a publisher or a subscriber. Also, in some embodiments, the subscription shortfall detecting program 34 may further include steps for handling shortfalls, such as extending the time intervals between consecutive publication events in a way that is proper for both the associated publisher and subscriber. It may also be noted that some functions of the subscription shortfall detecting program 34 may apply to actions on the publisher while other may apply to the subscriber. As such, both publishers and subscribers may include various forms of the subscription shortfall detecting program 34 for performing the appropriate steps for that particular device.

From the perspective of the publisher, network parameters or metrics may be measured at various points within a network or distributed system. In some cases, the measured data may be CPU usage information. The telemetry data is collected or retrieved over the course of a certain time period (e.g., 10 seconds) and then the telemetry data or Performance Monitoring (PM) data may be converted to an appropriate format for transmission. The telemetry data may be described using any suitable structured data modelling language (e.g., YANG) and may be encoded in JSON, XML, Google Protocol Buffers, etc.

After this preparation time, the streaming of the telemetry or PM data is achieved according to a publisher/subscriber arrangement that may be a predetermined or agreed-upon arrangement. For example, the arrangement may include an "agreement" where each publisher publishes (e.g., pushes, transfers, transmits, etc.) certain packets containing the telemetry data to one or more subscribers at specific agreed-upon time intervals. Also, the NEs 12 themselves may also record timestamps of when the telemetry data is actually transmitted. The NEs 12 can monitor the actual time intervals between subsequent or consecutive publication events, which may be related to a retrieval time and/or actual publication time intervals.

The actual time intervals can be compared with the agreed-upon time interval to determine if the publisher is honoring the agreed-upon arrangement or if there is some type of shortfall. Again, a shortfall may be caused by some type of change in the network or distributed system. The agreed-upon arrangement, for example, may be affected by changes in the network (e.g., new nodes, new subscriptions or subscribers, additional resources to be monitored, software changes, new services and/or microservices, availability of other nodes, congested channels, etc.).

It may be noted that the timestamp information may be communicated to the subscribers to allow the subscribers to detect the shortfall. Otherwise, the NEs 12 themselves may detect the shortfall. The adjustment to the pre-arranged subscription agreements may involve both the corresponding NE 12 and monitoring device 14. In some embodiments, the subscription shortfall detecting program 34 may include logic configured to enable the processing device to continually recheck to make sure that the actual time interval continues to meet (or not meet) the agreed-upon time interval according to the predetermined subscription arrangement. For instance, the ability of the publisher to meet the agreed-upon time interval may be affected by the retrieval time of the NE 12 (or associated publisher) and changes to the retrieval time. The NE 12 may be configured to aggregate or consolidate publications from other nodes for sending to the one or more subscribers.

Monitoring with respect to the agreed-upon time interval may include comparing an arithmetic expression with a benchmark value. The arithmetic expression may be a ratio between the actual (measured) time interval and the agreed-upon time interval, a difference of the two, or other formula or expression. If the agreed-upon time interval is not met, the systems and methods may raise alarm immediately or after a predetermined "raised-soak" period. For example, if the publication timings fail to meet the benchmark over the course of the predetermined soak period, the alarm can be triggered. Also, after a certain time period of failing to meet the publication times, the subscription shortfall detecting program 34 may be configured to adjust the publication details or subscription details to clear the alarm. For example, these adjustments may include extending the expected time intervals to a new agreed-upon value (e.g., from 10 seconds originally to a new value of about 15 to 20 seconds). Furthermore, according to various embodiments, these adjustments may include a) disallowing or preventing new publications or subscriptions from being added, b) adjusting the publishers, c) increasing the time interval of the publications, d) changing a priority setting of one or more of the publishers and/or subscribers, e) discontinuing one or more subscriptions, f) changing a congestion tolerance, and/or other modifications in the network.

According to some additional embodiments, the subscription shortfall detecting program 34 may include a "testing" procedure that can be performed prior to execution. The testing procedure may test the current state and/or topology of the distributed system to determine what effect adding a new publisher or subscriber might have on the distributed system. For example, a subscriber may request to create a new publisher. In response, the subscription shortfall detecting program 34 may be configured to predict how such a change would affect the ability of the publisher to meet the new demands. Also, if it is determined in this case that the new subscription would extend the time interval beyond the expected (or agreed-upon) time interval, then either the new subscription may be discarded, or a new agreement (with a new expected time interval) can be arranged between the associated publisher and subscriber.

Subscription Requests

Figure 3:
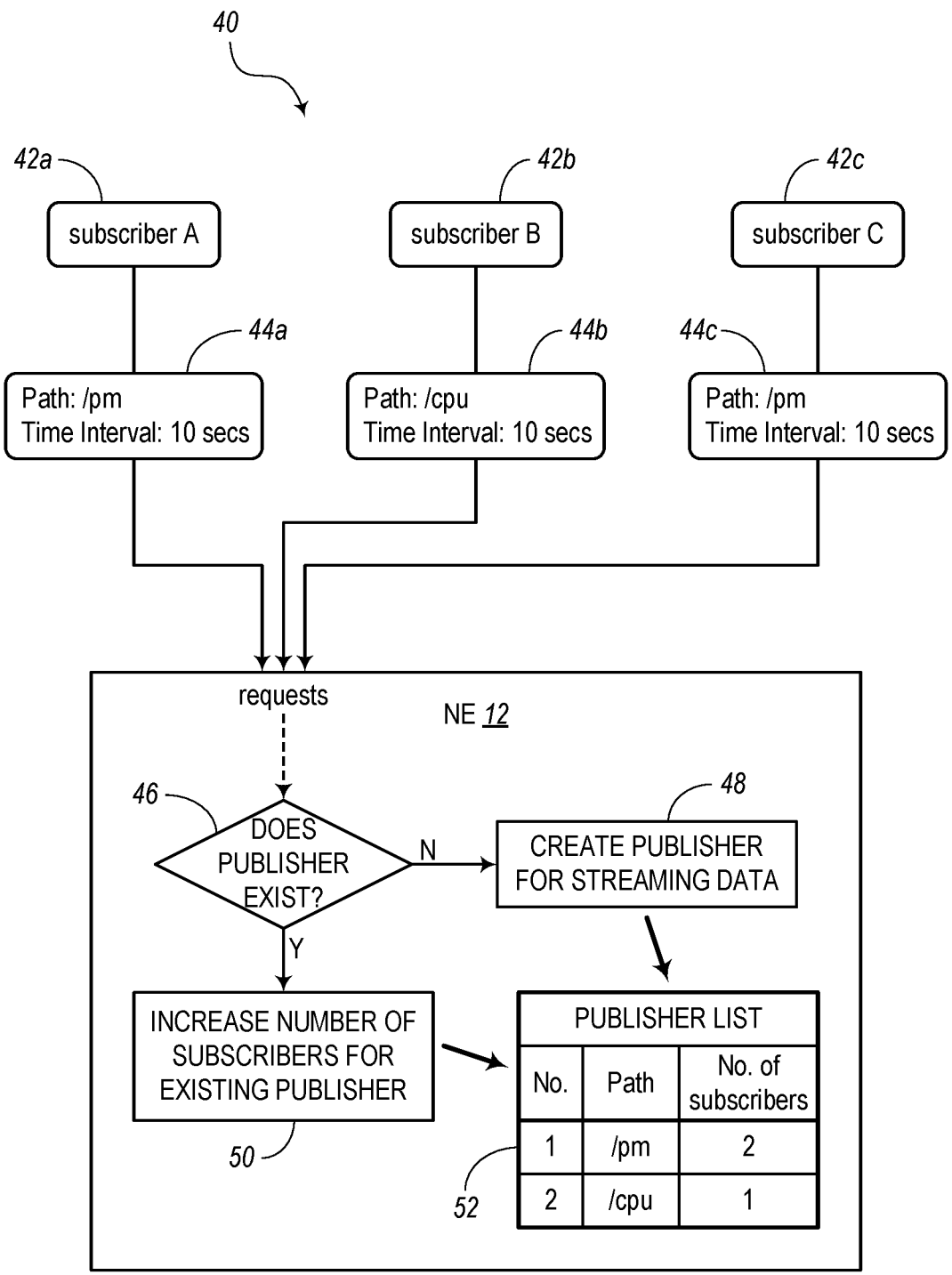
FIG. 3 is a diagram illustrating a system in which a Network Element (NE) is configured to receive subscription request from multiple subscribers, according to various embodiments.

FIG. 3 is a diagram illustrating an embodiment of a system 40 in which a NE 12 is configured to receive subscription requests from multiple subscribers. In this example, subscriber A 42a is configured to communicate with the NE 12 along a path to receive PM data (/pm) once every 10 seconds. Thus, the time interval between consecutive publications is 10 seconds or the publication frequency is one push event every ten seconds. The next subscriber (i.e., subscriber B 42b) requests CPU usage data (/cpu) once every 10 seconds. Also, subscriber C 42c requests to receive /pm data once every 10 seconds.

For each request, the NE 12 is configured to determine if a publisher already exists for publishing the specifically request data (e.g., /pm data, /cpu data, etc.), as indicated in the condition block 46. If no publisher exists, the NE 12 is configured to create a new publisher to allow that the request data can be streamed, as indicated in block 48. However, if the publisher already exists, the NE 12 is configured to increase the number of subscribers for the existing publisher, as indicated in block 50. In this way, blocks 48, 50 may be configured to change a table 52 that defines a publisher list.

In some embodiments, the requesting process also gives the subscribers 42a, 42b, 42c some level of flexibility for requesting a desired time interval at which data is to be provided. For example, in some cases, the time interval request may be any length of time or may be in multiples of 10 seconds (e.g., 10 seconds, 20 seconds, 30 seconds, etc.). A Network Monitoring System (NMS) may include the subscribers 42a, 42b, 42c and may monitor the network telemetry data (e.g., PM data, CPU usage data, etc.) for performing additional network management operations.

Monitoring Performance of Streaming Telemetry

In a system where there are unlimited computing resources, it is possible to provide publications at a requested frequency (e.g., provisioned time interval). However, in real world, this is not always the case. Unrealistic expectations of publishing time intervals can add pressure on the NE 12 to deliver.

In many cases, systems are designed upfront for worst-case or heaviest load conditions, which can be tested during testing operations in a lab. After testing, however, the changing conditions on the device (e.g., oftentimes unforeseen changes) can make it impossible to meet the demands of the clients (e.g., NMS, subscribers, etc.). In particular, network changes, such as new clients being added, new subscriptions being requested, additional resources being provisioned. more data being collected, and other changes, can make it difficult to maintain an originally agreed-upon publication arrangement. Also, software changes may result to longer processing times for NEs 12, additional microservices may be deployed, other network resources may be consumed or steered away by other demands, and communications channels can become congested due to network changes affecting traffic routes.

Shortfall Scenarios

Figure 4:
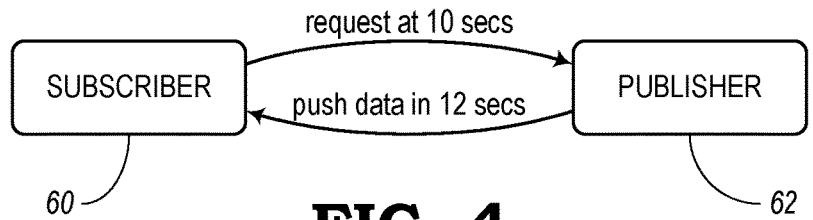
FIG. 4 is an interaction between a subscriber and publisher in which a shortfall situation can be detected, according to various embodiments.

FIG. 4 shows an example of an interaction between a subscriber 60 and publisher 62 according to a first scenario in which a shortfall can be detected. As illustrated, the subscriber 60 requests a subscription arrangement in which telemetry data is to be received once every 10 seconds. However, in this example, the publisher 62 is capable of retrieving the requested telemetry data and pushing the data in a publication at a rate of once every 12 seconds. Therefore, up front, it can be determined that the publisher 62 will fall behind and be unable to provide the telemetry data as requested by the subscriber 60, which will eventually overload the NE in which the publisher 62 is embedded or cause the NE to run in a sluggish manner. Even if the publisher tries to honor the 10-second request, the average retrieval and publication time will run behind.

Nevertheless, one solution to this deficiency, according to the systems and methods of the present disclosure, may be to increase an agreed-upon time interval to at least 12 seconds. In some cases, the time intervals may be configured in multiples of 10 seconds, such that an increase to a 20-second time interval would be an acceptable publication rate for transmitting telemetry data.

Figure 5:
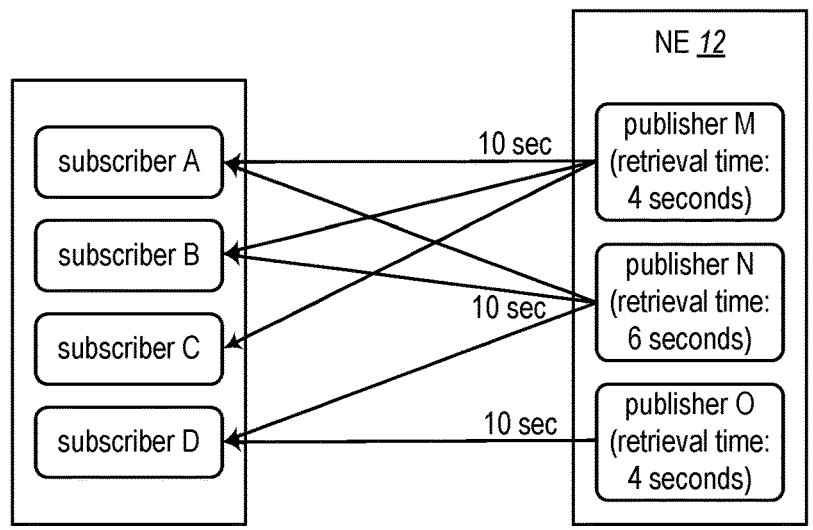
FIG. 5 is an interaction between multiple subscribers and multiple publishers in which a shortfall situation can be detected, according to various embodiments.

FIG. 5 shows an example of an interaction between multiple subscribers A, B, C, D and multiple publishers M, N, O of an NE 12 according to another scenario in which a shortfall can be detected. In this example, the subscribers A, B, C, D each request a subscription arrangement in which telemetry data is to be received once every 10 seconds. However, in this example, the retrieval and/or publication times of the three publishers M, N, O are cumulative for the NE 12. The first publisher M has a retrieval time of four second, the second publisher N has a retrieval time of six seconds, and the third publisher O has a retrieval time of four seconds. Thus, the cumulative retrieval time (e.g., 14 seconds) of all the publishers is more than the asked or requested time interval and again results in a failure to meet the requested rate.

Nevertheless, one solution to this deficiency, according to the systems and methods of the present disclosure, may be to increase an agreed-upon time interval to at least 14 seconds (e.g., 20 seconds when 10-second multiples are used). Another solution may be to remove or disable any one of the publishers M, N, O, whereby the cumulative times for the remaining two would be less than or equal to 10 seconds and would meet the 10-second request.

Figure 6:
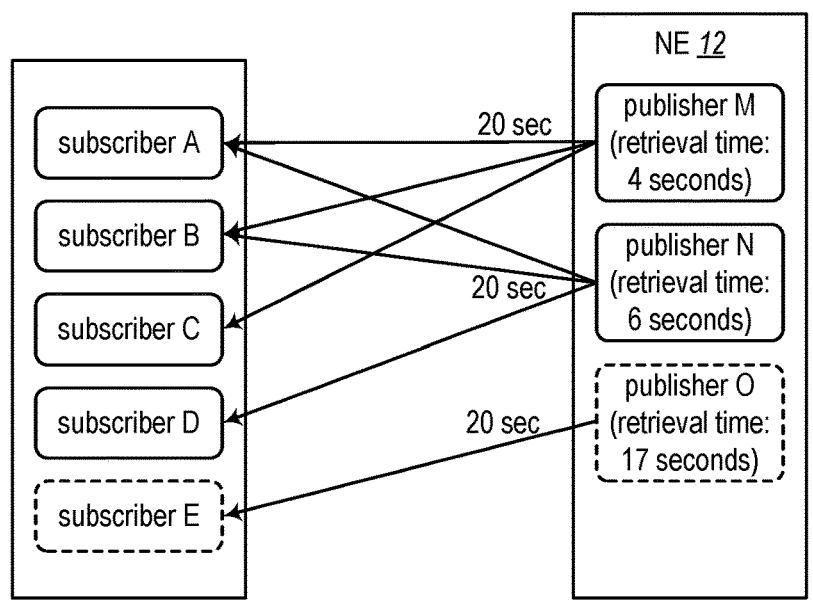
FIG. 6 is an interaction between subscribers and publishers in which a shortfall situation is created by the addition of a new subscriber and publisher, according to various embodiments.

FIG. 6 shows an example of an interaction between subscribers A, B, C, D and publishers M and N, according to another scenario in which a shortfall is created when new subscriber E and new publisher O are added. Before the addition, the subscribers A, B, C, D request a 20 second time interval. Since the publishers M, N have retrieval times of four seconds and six seconds, respectively, the NE 12 will have a cumulative retrieval time of 10 seconds for easily meeting the 20-second requested publication rate. However, once the third publisher O is added, where the publisher O has a retrieval time of 17 seconds, the cumulative time is increased to 27 seconds, which no longer meets the requested or initially agreed-upon 20-second time interval (or publication rate). Thus, the NE 12 is able to initially honor the subscription requests, but the change to the distribution system (e.g., adding of subscriber E and publisher O) pushes the cumulative retrieval time past the requested interval.

Once this deficiency is detected, there may be multiple solutions for overcoming the shortfall according to the embodiments of the present disclosure. One solution may be to move the publishers M, N to another NE, even an NE that can accept requests of at least a 10-second time interval between consecutive publications. Another solution may be to prohibit the publisher O from being added on the NE 12 or recommending that the new publisher O be added to another NE. Yet another solution may include increasing the interval between consecutive publication events to at least 27 seconds (e.g., 30 seconds when 10-second multiples are used).

There may be several reasons why a system may be unable to meet requested subscription times, such as, for example, a) the addition of a new publisher O or the addition of a new subscriber E, as described with respect to FIG. 6, b) other operations that may affect the resources of the NE 12, such as an extra load on a CPU, memory, and/or comms due to serialization of data, c) asynchronous events and/or requests, such as, for example, Create, Read, Update, Delete (CRUD) operations performed, which may require more NE resources for a longer duration, and/or d) a sudden increase in notifications generated in the NE 12 due to any external/internal factors.

Figure 7:
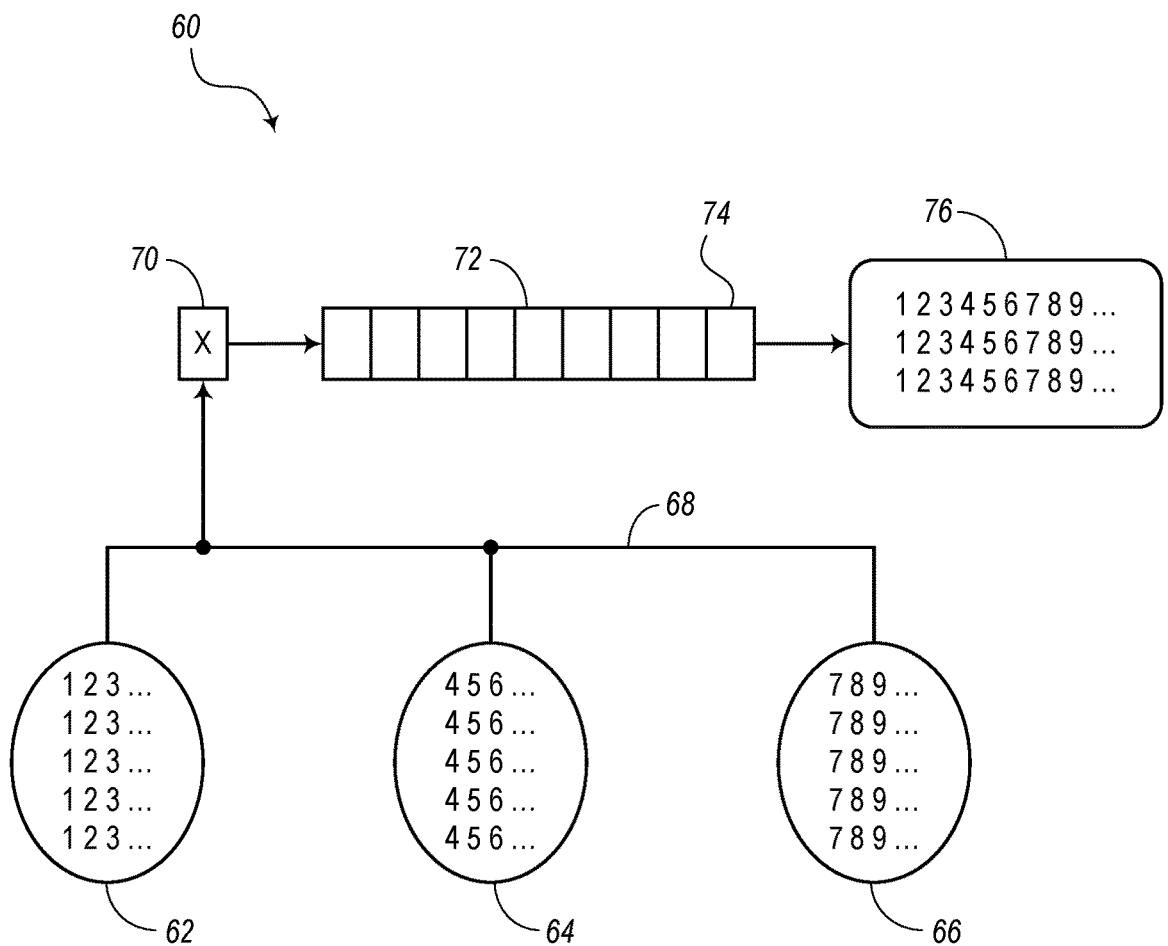
FIG. 7 is a diagram illustrating a situation resulting in a processing delay, according to various embodiments.

FIG. 7 is a diagram illustrating an example of a situation resulting in a processing delay in a system 60. The system 60 may include multiple sources 62, 64, 66, where the first source 62 is configured to generate series of data elements 1, 2, 3, . . . , the second source 64 is configured to generate series of data elements 4, 5, 6, . . . , and the third source 66 is configured to generate series of data elements 7, 8, 9, . . . . The sources 62, 64, 66 may be remote nodes in the system 60 and may be configured to communicate along the same comms channel 68.

In a local NE, arriving data 70, which may include data series X, is received from the comms channel 68 and is to be added to a data flow 72. However, because of a high data flow 72, the data in the data flow 72 may be backed up such that processing of the data flow 72 may be delayed. A data element 74 that is the next to be processed may eventually be submitted to a client (e.g., subscriber) or collector (e.g., consolidating node), which may be configured to aggregate the data 76 from multiple sources 62, 64, 66.

Therefore, according to additional embodiments of the present disclosure, the system 60 may be configured to consolidate telemetry data from one or more NEs or nodes. As such, changes to the consolidation (e.g., adding new nodes) may also have an impact on retrieval times and may cause the NE 12 to be unable to meet requested publishing rates (or time intervals between consecutive publications).

Therefore, in a cluster environment or anywhere in a system, there may be one node that is consolidating the data generated from one or multiple nodes. In such cases, a controller (e.g., including the subscribers) may subscribe to the paths which belong to cards or pluggable on the same node or on multiple nodes. As such, it is possible that each node, card, or pluggable can handle the streaming request independently, but due to limited resources, the consolidator or aggregator node might be unable to consolidate and transmit the data in the requested time. In these scenarios, the actual publishers may not be able to detect a problem locally, but the subscription shortfall detecting program 34 may be configured to detect the shortfall to limit the consolidator or aggregator node accordingly since it will not be able to keep up with the requested demand.

Furthermore, a chain of devices all on the same communications (comms) channel can overload the channel and burden the CPUs of the NEs 12 responsible for processing the telemetry packets. Also, a consumer (e.g., subscriber) of multiple devices may undergo a change which has fewer resources to be able to process the data from all the devices.

Detecting Shortfalls

The subscription shortfall detecting program 34 may include a procedure or algorithm configured to periodically monitor the retrieval time with respect to provisioned (agreed-upon) duration (time interval between consecutive publications) against a robustness benchmark or threshold. If the benchmark or threshold is violated (e.g., having an actual publication time interval longer that a requested or agreed-upon time interval), then an alarm can be raised. The benchmark or threshold can be a customer configurable value, based on particular demands and understanding of the capabilities of the network resources.

The basic test for performance is how well the actual emission timing matches the requested timing. The reasons for a shortfall can also be monitored, if possible, but it is not necessary in some cases. If a subscription has been requested that there is a publication (e.g., of telemetry data) every X seconds, but the system 60 can only be published, on average, every X+F seconds, then F is the average shortfall. If F is greater than the benchmark value or threshold, then an alarm condition is reached. In some embodiments, the average amount F over the requested amount X may be observed over a period of time for one or more subscriptions, and then an alarm condition may be raised after a certain saturation or raised-soak condition is detected, as describe with respect to FIG. 8.

Figure 8:
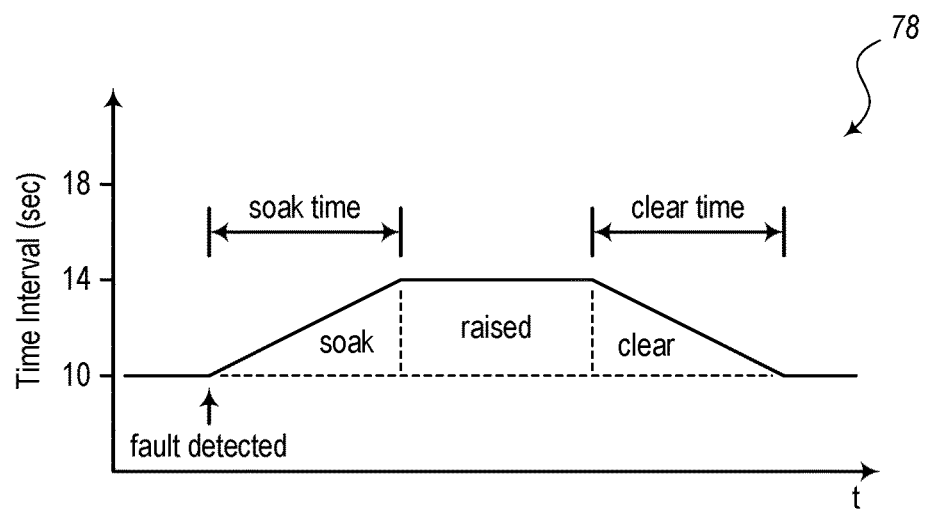
FIG. 8 is a graph illustrating an example of a lifecycle of a shortfall situation.

FIG. 8 is a graph 78 illustrating an example of a lifecycle of a shortfall situation with respect to observing a time interval, such as an agreed-upon or requested time interval representing the rate at which consecutive or subsequent publications can be pushed to subscribers. In this example, the requested time interval is 10 seconds. Over time, it can be seen in the graph 78 that publications are originally able to meet the requested 10-second rate. However, at some point in time, a fault is detected in which the amount of time between consecutive publications increases during a "soak time." As mentioned above, the increase in time interval may be due to some type of change in the network that puts extra burdens on the NE 12.

Next, the graph 78 shows a raised period where the time interval levels off. In this example, the time interval levels off at 14 seconds during a raised period of time. Then, at some time thereafter, some additional change (e.g., removing a subscriber, removing a publisher, etc.) may be made to the system that enable the NE 12 to catch up to the requested benchmark or threshold of the 10-second time interval. This period may be referred to as a "clear time" when the fault is being cleared, after which the NE 12 recovers to a point where it can again meet the threshold conditions. It may be noted that the systems and methods of the present disclosure may be configured to raise different types of alarms during the different phases of the soak time, raised time, and clear time in order to indicate when a deficiency or shortfall is detected and when it is cleared.

Figure 9:
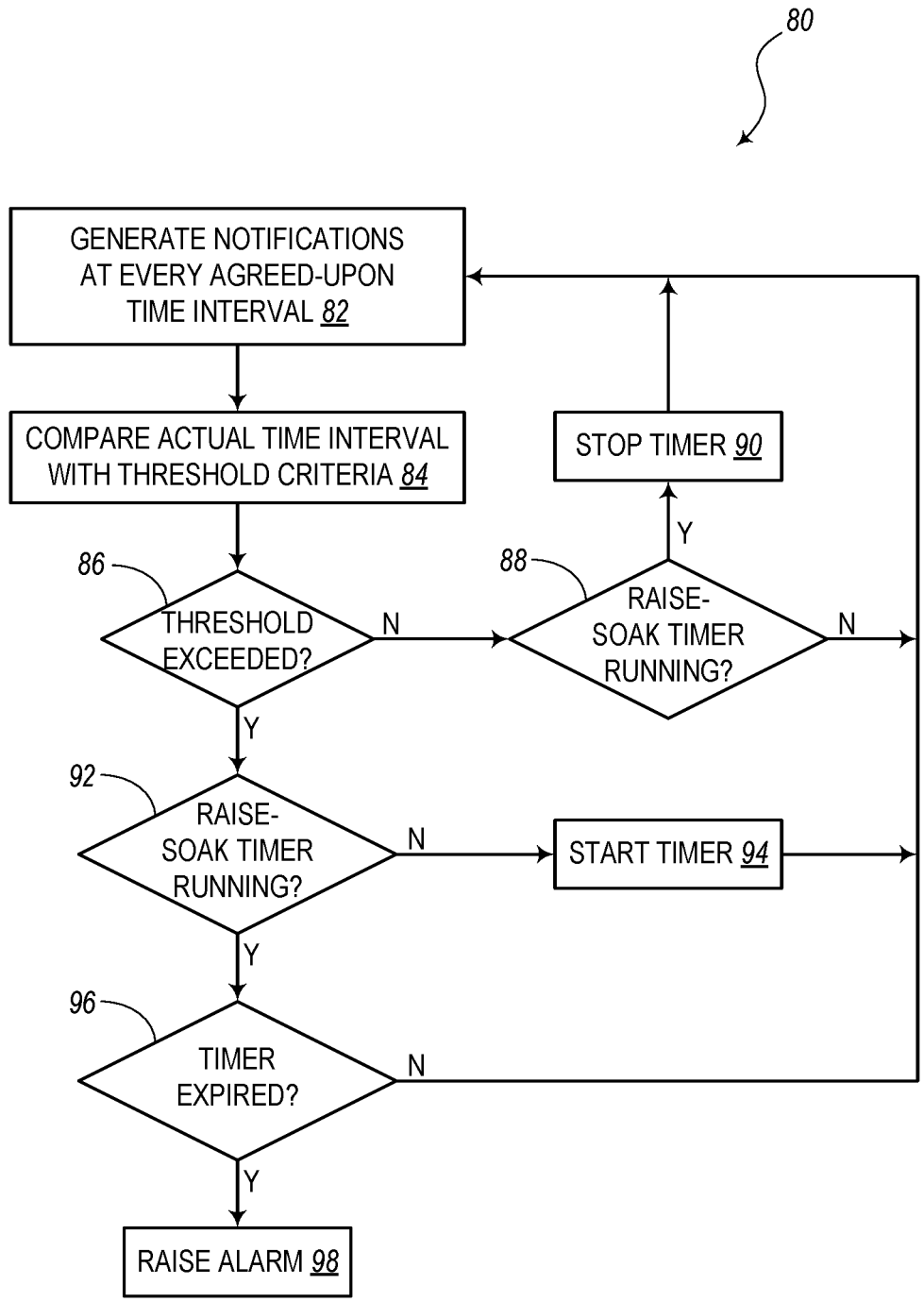
FIG. 9 is a flow diagram illustrating a process for raising an alarm with respect to a raise-soak condition of the graph of FIG. 8, according to various embodiments.

FIG. 9 is a flow diagram illustrating a process 80 for raising an alarm with respect to the raise-soak condition of the graph 78 of FIG. 8. The process 80 includes generating notifications at every agreed-upon time interval, as indicated in block 82. The notifications may used as timestamps to mark when each publication is pushed or transmitted to the one or more respective subscribers. Next, the process 80 includes comparing an actual time interval (e.g., difference between a first timestamp and the next timestamp) with threshold criteria, as indicated in block 84. The process 80 then determines if the threshold has been exceeded, as indicated in condition block 86. If the time interval meets the request and does not exceed the threshold, the process goes to condition block 88, which includes the step of determining if a raise-soak timer is running (e.g., corresponding to the soak and/or raised sections of the graph 78 of FIG. 8). If the raise-soak timer was running, the time is stopped, as indicated in block 90, and the process loops back to block 82. If the raise-soak time was not running, the process 90 similar returns back to block 82.

If it is determined in condition block 86 that the threshold has indeed been exceeded (i.e., the time interval does not meet the requested time interval), then the process 80 goes on to condition block 92. In condition block 92, the process 80 is configured to determine if a raise-soak timer is running. If the threshold is exceeded but the timer has not yet been started, then the process goes to block 94, which includes the step of starting the raise-soak timer, and then returns back to block 82 to process more notifications. However, if the threshold is exceeded and the raise-soak timer has already been started, the process 80 goes from the condition block 92 to condition block 96, which determines whether the timer has expired. If not, the process returns back to block 82. Otherwise, the process 80 is configured to raise an alarm, as indicated in block 98. In other words, the raise-soak timer may be configured run for a certain period of time to allow the system to self-correct, if possible, such as due to a temporary network issue that can be overcome within a short time. Otherwise, the running of the raise-soak timer may be indicative of a sustained issue, deficiency, or shortfall where intervention may be needed to overcome the issue. Thus, the alarm may be provided to a network operator (e.g., associated with an NMS), who may then determine that changes to the publishers and/or subscribers may be needed to allow the system to operate with the original (or new) subscription arrangements or agreements. If the NE 12 continuously exceeds the benchmark for the raise-soak period, then this condition will be alarmed for notifying the user or network operator. In response, the publishing time interval will be increased (i.e., the publication rate or frequency is decreased corresponding whereby one publication event occurs every increased-time period). Also, in response, the network operator may prohibit the introduction of new streaming requests until the system is able to recover.

According to some embodiments, the process 80 may be associated with another type of test. For example, the process 80 may be configured to monitor CPU idle levels or available comms bandwidth and declare a failure condition (and raise an alarm, as in block 98) if the available resources are below a configurable threshold.

In some embodiments, the threshold criteria described in blocks 84, 86 may be defined by:

$$\Sigma(Tn/Fn) < K$$

where Tn=retrieval time of the 'nth' publisher, Fn=frequency of 'nth' publisher, and K=Robustness benchmark, $0 < K \leq 1$.

Figure 10:
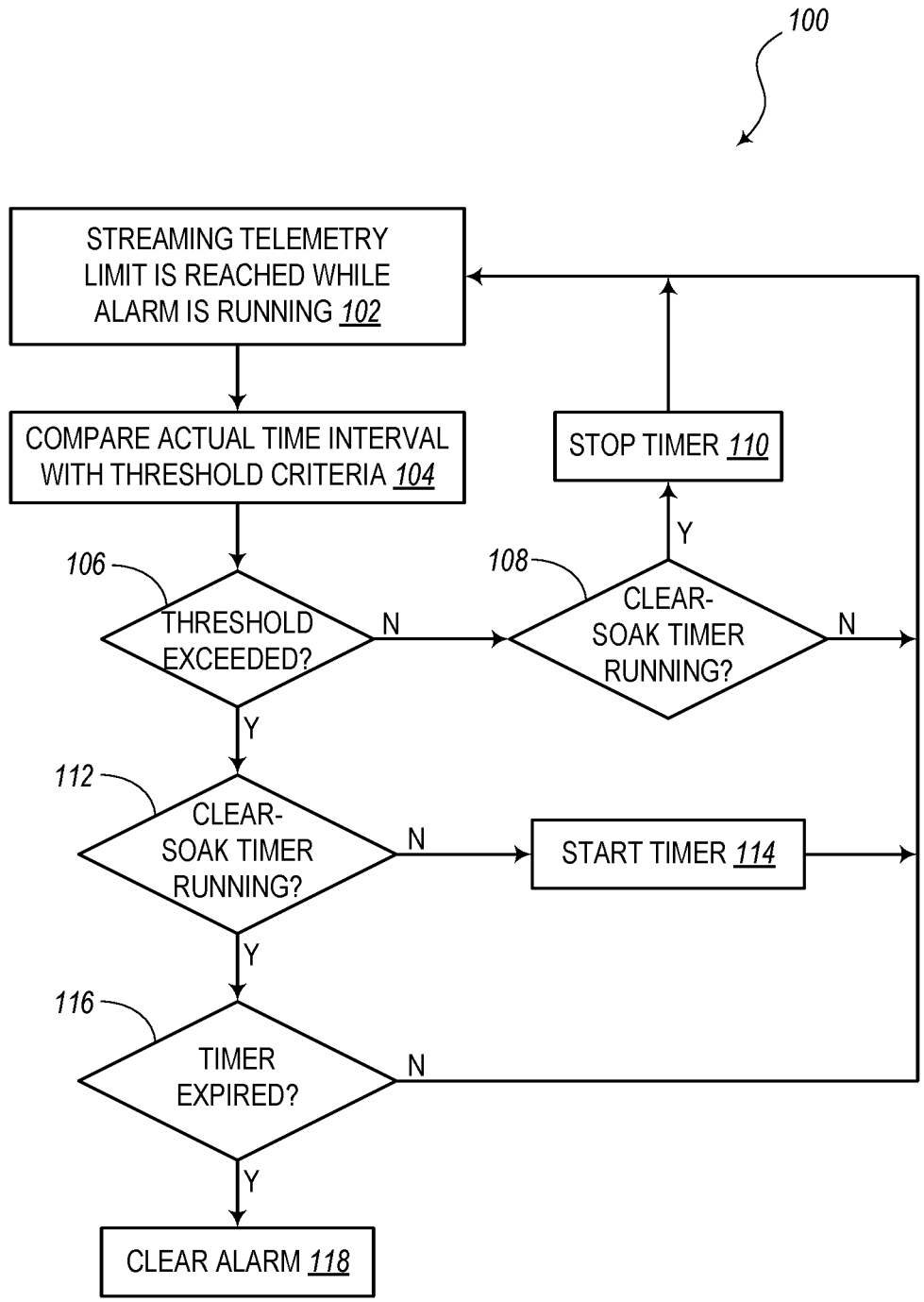
FIG. 10 is a flow diagram illustrating a process for clearing an alarm with respect to a clear-soak condition of the graph of FIG. 8, according to various embodiments.

FIG. 10 is a flow diagram illustrating a process 100 for clearing an alarm (e.g., the alarm raised in block 98 of FIG. 9). Again, the alarm may be associated with a clear-soak condition as illustrated in the graph 78 of FIG. 8. In this embodiment, the process 100 includes the detection that the streaming telemetry limit has been reached while the alarm is running, as indicated in block 102. The process 100 also include comparing the actual time interval with threshold criteria, as indicated in block 104 and as similarly executed in block 84 shown in FIG. 9. Next, the process 100 includes determining if the threshold has been exceeded, as indicated in condition block 106. If the threshold is no longer exceeded, the process 100 goes to condition block 108 to determine if the clear-soak timer is running. If it is not running, block 110 is skipped and the process 100 returns to block 102. If it is running, the process 100 stops the timer, as indicated in block 110, and then goes back to block 102.

If it is determined in condition block 106 that the threshold has been exceeded, then the process 100 proceeds to condition block 112, which includes the step of determining if the clear-soak timer is running. If the threshold is exceeded but the timer is not yet running, then the process 100 goes to block 114, which includes the step of starting the clear-soak timer, and then goes to block 102. If it is determined in condition block 112 that the clear-soak timer is running, the process 100 proceeds on to condition block 116, which includes the step of determining if the timer has expired. If not, the timer continues to run and the process 100 goes back to block 102 to continue processing more publication events. However, if it is determined that the timer has expired, the process 100 includes clearing the alarm 118. After the alarm is cleared, the system may then execute the process 80 of FIG. 9 again.

Thus, the alarm will be cleared, or a "clear notification" will be raised when the benchmark is not being met for the clear-soak period. The alarm will be cleared, or "clear notification" will also be raised if all the telemetry streaming publishers are cleared from the system. Regarding an external assertion of the condition, if an outside consolidator or consumer detects a problem where the data is overloading a shared resource or cannot be consumed fast enough, it can assert a failure state to producers so they can reduce the amount of data being sent.

Figures 11, 12:
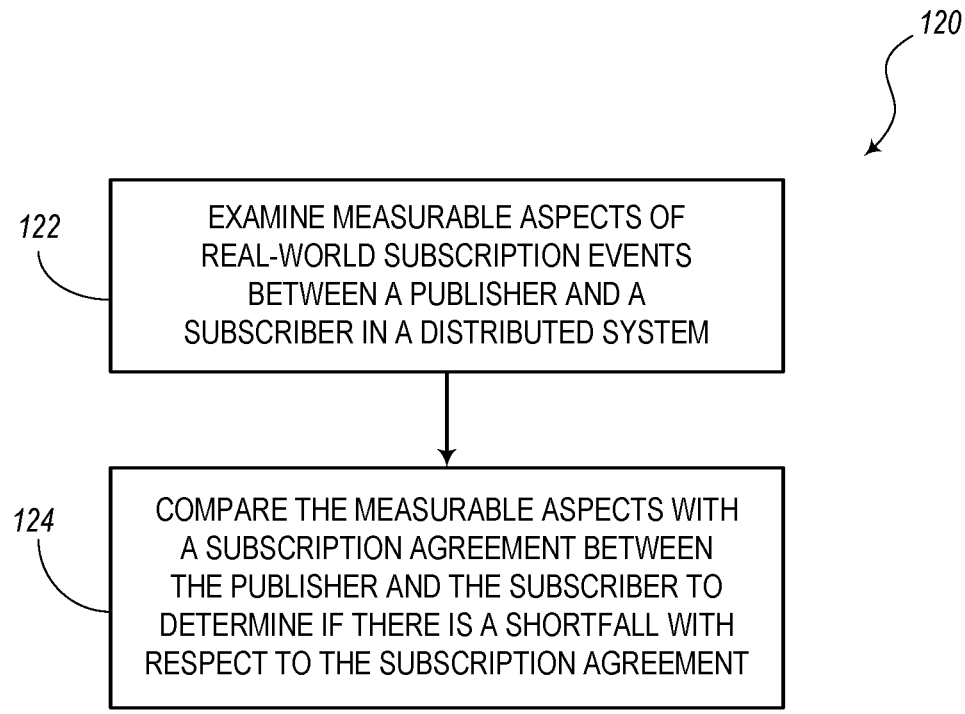
FIG. 11 is a table illustrating a strategy for increasing a time interval between consecutive publications according to a subscription agreement, according to various embodiments.
FIG. 12 is a flow diagram illustrating a general process for determining if there is a shortfall with respect to a subscription agreement, according to various embodiments.

FIG. 11 shows an example of a table illustrating a strategy for increasing a time interval between consecutive publications according to a subscription agreement. If a raise-soak timer expires a first time, the time interval may be increased from 10 seconds to 20 seconds (for a first publisher M) or the time interval may be increased form 30 seconds to 60 seconds (for a second publisher N). If this timer expires a second time or a third time, the time interval can be increased again by a certain amount for the respective publisher.

It is possible to thereby overcome the challenges of not meeting the agreed-upon time intervals. The interval between consecutive publication events, which is inversely proportional to a publishing frequency or rate, can be increased according to any suitable plan, such as the strategy outlined in the table of FIG. 11. The allowable time interval between publications (for each publisher) can be increased in an arithmetic progression each the raise-soak timer expires. The increase may be a common difference as the respective provisioned, requested, or initially agreed-upon time interval. The "streaming telemetry limit reached" alarm may be raised when the raise-soak timer expires for the first time.

Referring again to FIGS. 4-6 with respect to the three described scenarios, a threshold criteria (Tn/Fn) with respect to FIG. 4 may be determined to exceed a Robustness Factor (K). That is, assuming K is set to 1 and the criteria (12/10) exceed K, this deficiency scenario will raise an alarm and the time interval will be incremented to 20 seconds between timestamps of consecutive publishing events. By increasing to 20 seconds, the new criteria are calculated, wherein 12/20 no longer exceeds K (i.e., 1), so after this increase, the system will be in a stable state.

With respect to FIG. 5, the cumulative retrieval time is greater than the asked time (i.e., (4+6+4)/10 exceeds the Robustness Factor (K=1)), so the situation will be alarmed, and interval will be incremented to 20. Thus, since the new expression 14/20 does not exceed K (i.e., 1), after increasing the interval, the system will be in a stable state.

Regarding FIG. 6, the cumulative retrieval time is initially less than the asked time (i.e., (4+6)/20 is less than 1). However, the addition of the new publisher O (with retrieval time of 17 seconds) results in new threshold criteria (i.e., (4+6+17)/20 exceeding the Robustness Factor 1), so the situation will be alarmed. The allowable interval is incremented to 40 seconds. Thus, since 27/40 does not exceed K (i.e., 1), the first increase is able to put the system in a stable state.

Recovery Methods

Recovery methods can vary from user to user and can therefore be controller by a network operator providing control signals to a controller, NMS, etc. These recovery methods are a few examples and can be provisioned to recover when telemetry streams are falling behind.

1. No new publisher/subscriber will be entertained.
2. One or more of the publishers will be adjusted. The publishers may be allowed to publish the data at an increased duration, which can be directly related to their respective provisioned or originally requested duration. The increase can be related to an Arithmetic Progression, Geometric Progression etc.
3. Priority can be given to each of the publishers. Publisher may be adjusted based on their priority. For example, a higher priority publisher may be adjusted less (or not at all in some cases) while low priority publishers may be adjusted more in order to accommodate any shortfall.
4. Certain clients or subscribers can be prioritized as lower priority. When the congestion is detected, for example, some clients may be suppressed entirely.
5. The time duration range can be given with each publisher. In the case when the publisher is unable to publish the data within the given range, then the publisher can be suspended (e.g., permanently or temporarily). A nominal or max duration for publishing can be provided to indicate the tolerances to congestion a given publication may have.

These recovery methods may include an automated self-recovery strategy. For example, the NE 12 may identify the problem and then initiate the recovery procedures defined throughout the present disclosure. In some embodiments, a hysteresis type of change may be applied, or the systems can apply an adjustment factor for a smooth adjustment. As such, this strategy may be effective to prevent undesirable toggling of the condition with unpredictable publication rate changes. Alternative to self-recovery, the systems and methods of the present disclosure may include an external application, where an external entity may be configured to process the time intervals and/or publication timestamps to externally control provisioning to initiate or invoke recovery procedures.

General Process for Detecting Subscription Shortfall

FIG. 12 is a flow diagram illustrating an embodiment of a general process 120 for determining if there is a shortfall with respect to a subscription agreement. As shown in FIG. 12, the process 120 may include examining measurable aspects (e.g., time) of real-world subscription events between a publisher and a subscriber in a distributed system, as indicated in block 122. The process 120 further includes the step of comparing the measurable aspects with a subscription agreement between the publisher and the subscriber to determine if there is a shortfall with respect to the subscription agreement, as indicated in block 124. Again, detecting subscription shortfall, as described in the present disclosure, are typically not addressed in conventional systems.

In some embodiments, the measurable aspects described in the process 120 may include time interval calculations between consecutive publishing events, where the time interval calculations may be based on timestamps recorded at each publishing event. The publisher may be configured on a Network Element (NE) in the distributed system. The process 120 may further include the step of obtaining a) Performance Monitoring (PM) data related to the distributed system and/or CPU usage characteristics of the NE, b) stream telemetry data associated with the PM data, c) CPU usage characteristics from the publisher of the NE to the subscriber of a Software-Defined Networking (SDN) controller of a Network Monitoring System (NMS), and/or other network metrics. The streamed telemetry data may be described using a structured data modelling language (e.g., YANG). The step of comparing the measurable aspects with the subscription agreement (block 124) may include the step of determining whether resources on the NE are sufficient to meet the subscription agreement within a predetermined retrieval time or are insufficient to meet the subscription agreement and are thereby responsible for causing a shortfall. The NE, in some embodiments, may be configured to consolidate publications from one or more nodes within the network to push to one or more subscribers.

According to some embodiments, the process 120 may be executed on a Network Monitoring System (NMS) in the distributed system and the subscriber may be configured in a Software-Defined Networking (SDN) controller of the NMS. The step of comparing the measurable aspects with the subscription agreement (block 124) may also include determining whether resources on the NMS are sufficient to meet the subscription agreement within a predetermined consuming time or are insufficient to meet the subscription agreement and are thereby responsible for causing a shortfall. The subscriber may be configured to receive telemetry data from the publisher, and the NMS may use the telemetry data for various purposes, such as for network automation, traffic optimization, troubleshooting, among other purposes.

A shortfall with respect to the subscription agreement may be caused, for example, by one or more changes in the distributed system, such as a) an addition of a new publisher, b) an addition of a new subscriber, c) an addition of a new subscription agreement, and/or other causes. The shortfall with respect to the subscription agreement may also be caused by a) an addition of a new node in the distributed system, b) additional resources to be monitored, c) software or firmware changes, d) a new service or microservice in the distributed system, e) a status of traffic channel conditions, and/or other causes.

The step of determining the shortfall (block 124) may include calculating an arithmetic expression based on a measured time interval between consecutive publishing events and an agreed-upon time interval of the subscription agreement and determining when the arithmetic expression exceeds a benchmark value. In response to determining that there is a shortfall with respect to the subscription agreement over a predetermined soak period, the process 120 may further include the step of raising an alarm. In response to determining that there is a shortfall with respect to the subscription agreement, the process 120 may further include the step of modifying the subscription agreement. For example, modifying the subscription agreement may include a) increasing the agreed-upon time interval, b) preventing the addition of new subscriptions, c) changing priority settings with respect to one or more publishers and/or one or more subscribers, d) discontinuing one or more subscriptions, and/or other internally or externally controlled actions.

Conclusion

Therefore, publishers will be able to publish data at provisioned times when there is no alarm. A Streaming Telemetry Limit Reached alarm may indicate:
the system is not able to honor the provisioned frequency;
current publishing time will be a multiple of respective provisioned time;
no new publisher can be added;
and/or other conditions.

Clearing the Streaming Telemetry Limit Reached alarm may include:
NMS may keep only essential publishers;
provisioned times of existing publishers may need to be adjusted;
NMS may delete one or more (or all) publishers and start essential publishers with adjusted frequency;
and/or other actions.

The present disclosure may be related to sending telemetry data or any type of data in a subscription-type communication from publishers to subscribers (e.g., SDN controllers). This may be related to data-model driven subscriptions. The controller (client) may subscribe for elements of a model in order to be notified when something changes (and measurable parameters can be obtained) or the subscriber may request to receive periodic pushes of data. For example, this could be related to power monitoring systems, which might not need to publish all the time, but might push data about every 10-30 seconds, for example, or whenever a subscriber can handle the data.

In general, a customer may request certain types of data elements to be streamed. Equipment may be tested in a lab to statically define the data to make sure that the amount of this data does not change. However, even if a subscription does not change, the amount of data might change, such as, for example, if a new card, pluggable, node, etc. is added or if new services are added. Therefore, theoretical amount of data that can be streamed (as determined in the lab in a worst-case testing scenario) might not match what happen in the real-world. Therefore, the actual limitations may depend on a number of unforeseen network changes, such as network scaling beyond what may originally have been anticipated. Thus, detecting shortfalls in the publication of telemetry streaming may depends on how much data is being streamed, how often the publications are pushed, comms traffic bandwidth or routing changes, or any other changes in a distributed system, etc. Regarding comms traffic, routes may be during operation. For example, suppose a network streams data for 10 shelves through one link and then, after network changes to deployed equipment, rerouting, etc., the network may then stream data for 20 shelves through that link. In this case, the network may experience comm saturation, and any collector nodes may start to fall behind and not be able to meet the originally requested subscription agreements. Also, if the amount of data on the system changes, publishers can fall behind. The network may require additional resources to push that data out in a timely manner.

Therefore, the embodiments of the present disclosure are not necessarily related to a new way of publishing, but instead may be directed to various ways of detecting a "shortfall" in the publishers and/or subscribers to keep up with pushing or consuming certain amounts of data at certain time intervals. The shortfall can be caused by having too little resources on the publishing side and/or on the consumer side. The present disclosure also related to how the systems and methods can react to this shortfall so that things do not completely fall behind to an unrecoverable point.

There may be two methods for detecting shortfall, where one is an internal method and the other is an external method. For example, an internal shortfall may include simply looking at timestamps on the data being published. If a client wants data every 10 seconds and the publisher can only push data every 15 seconds, the system will always be falling behind. In a more sophisticated approach, the system may look at memory and resources to determine CPU usage. For example, if the publishing tasks are intended to consume about 40% of the CPU, but if it is thereafter determined that the publishing consumes much more of the CPU (e.g., 70%), when the system may decide to slow things down a little bit, such as by increasing the time between each publication (e.g., change a publisher publishing once every 10 seconds to instead publish once every 20 seconds). This is internal way of detecting shortfall.

External ways of detecting shortfall may include detecting comms bandwidth and how much comms is being used on a pipe. Thus, the system may allow the network operator to set limits regarding bandwidth and channels. Perhaps an easy way might be to look at the consumers, because if data is pushed every ten seconds, but it takes the consumer 15 seconds to consume that data, then the system might fall behind on the consumer side. It could be that a given node, where there might be one node in a system, may be able to consume data from that publisher with no problem, but as soon as the network where the node receive data from hundreds of nodes, the node may not have enough CPU availability to keep up.

In some embodiments, the comms link may be OSC, GCC, or any suitable communication layer that allow IP traffic therethrough. The bandwidth of these links may be 1 GbE, 100 Mb, 10 Mb, or any suitable rate. In some cases, various links may lead to certain failure conditions. A system may be engineered for 100 Mb bandwidth, but then there might be a failure that might cause traffic to be redirected through a smaller link.

Internally, the system can detect when it is falling behind by using the timestamps of when the data is published. If it falls behind, the system can increase the time interval (or decrease the frequency or rate) and see if the data can be published successfully in that amount of time. If not, and it is still falling behind, it can be increased to an even longer time period (between publications) until the system stabilizes. In some respect, internal monitoring may be performed in the NE itself, while external monitoring may be performed on the SDN controller or at some other controller, NMS, etc., outside the NE. Both of these types of monitoring can be done at the same time. In particular, the networks described herein may refer to optical networks or telecom networks.

The NE can detect a "publishing time missed" fault in the streaming telemetry. This fault can be reported, and the NE may initiate a self-recovery procedure. This allows detection of resource shortfalls locally. Methods may configure subscriptions in such a way that acceptable adjustments can be made in shortfall conditions.

Methods to adjust telemetry streams in shortfalls conditions may include locally detected faults, such as a) publication timestamps falling behind collection timestamps, b) CPU, memory, or comms bandwidth falling below a certain level, and/or remotely detected faults, such as consumption timestamps falling behind publication timestamps.

While system level testing for worst case may be important for network planning, it is also important to know when a network is unable to cover expected requests during real-world use cases. When the system cannot respond due to changing system conditions, the devices must be able to report detected problems and attempt to resolve the problems, such as by moving to a more reasonable state. By allowing adjustments in the midst of normal network operation (e.g., some time after original deployment of the network), network devices can be produced with this functionality to provide customer with confidence that streaming services can be adjusted on the fly as needed to account for unforeseen network changes. Also, the present disclosure allows for cases where worst-case testing cannot be done due to limited timing or testing resources. Without upfront testing, a system can be set with default publication time intervals and then adjust as needed when the actual real-world time intervals cannot keep up with the default settings.

According to event more embodiments, the systems and methods of the present disclosure may be configured to accommodate publication/subscription (pubsub) back pressure communications from the subscriber to the publisher to indicate when the subscriber detects an inability to keep up. For example, back pressure systems may be used in certain links (e.g., Apache NiFi, Akka Streams, etc.).

The systems and methods may be applicable for detection mechanisms regarding queue saturation, as described with respect to FIG. 7, which may include any suitable mechanisms to detect shortfall. In telemetry flows with periodically published data, the timestamps may be used to detect when the producer (publisher) does not have enough resources to publish. In addition, the timestamps can also be used to detect when a consumer (subscriber) does not have enough resources to consume the publication data.

In the case of a collector collecting telemetry from multiple (e.g., 1000) nodes, each producer may be able to operate properly, and each queue can have a small number of elements in it. However, since there may be many queues to service, the consumer may choose to adjust each producer so that it can service more queues at the same time, even if it is just for a brief time window.

It may also be worth noting that the detection and external back pressure may therefore be part of the present disclosure. Another aspect may be the ability to provide preference to some higher priority producers in the case of an adjustment. Normally, back-pressure may refer to the condition of a consumer (subscriber) being overwhelmed by the producer (publishers) and reporting the inability to keep up. In this case, adjustments to the publishers and/or subscribers can be performed automatically, or the system may provide recommendations to a network operator for enacting the adjustments manually. By specifically measuring shortfall, some type of automatic or manual intervention can be performed to improve or prioritize a producer with limited resources, which could be helpful for networks where publisher might produce multiple streams of interest.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
      examine measurable aspects of real-world subscription events between a publisher and a subscriber in a distributed system that is a network, wherein the real-world subscription events are telemetry data in the network streamed from the publisher to the subscriber,
      compare the measurable aspects with a subscription agreement between the publisher and the subscriber to determine if there is a shortfall with respect to the subscription agreement, and
      responsive to the shortfall, raising an alarm in the network and causing one or more recovery processes to address the shortfall including discontinuing one or more subscriptions that are lower priority than one associated with the shortfall.

2. The system of claim 1, wherein the measurable aspects include time interval calculations between consecutive publishing events, the time interval calculations being based on timestamps recorded at each publishing event.

3. The system of claim 1, wherein the system and the publisher are configured on one or more Network Elements (NEs) and one or more monitoring devices in the distributed system.

4. The system of claim 3, wherein the instructions further enable the processing device to
   obtain one or more of Performance Monitoring (PM) data related to an NE, of the one or more NEs, CPU usage characteristics of the NE of the one or more NEs, and YANG data, and
   stream the telemetry data associated with one or more of the PM data, CPU usage characteristics, and YANG data from the publisher of the NE to the subscriber of a Software-Defined Networking (SDN) controller of a Network Monitoring System (NMS).

5. The system of claim 4, wherein the streamed telemetry data is described using a structured data modelling language.

6. The system of claim 3, wherein comparing the measurable aspects with the subscription agreement includes determining whether resources on the NE are sufficient to meet the subscription agreement within a predetermined retrieval time or are insufficient to meet the subscription agreement and are thereby responsible for causing a shortfall.

7. The system of claim 3, wherein the NE is configured to consolidate publications from one or more nodes within the distributed system to push to one or more subscribers.

8. The system of claim 1, wherein the system is configured on a Network Monitoring System (NMS) in the distributed system and the subscriber is configured in a Software-Defined Networking (SDN) controller of the NMS.

9. The system of claim 8, wherein comparing the measurable aspects with the subscription agreement includes determining whether resources on the NMS are sufficient to meet the subscription agreement within a predetermined consuming time or are insufficient to meet the subscription agreement and are thereby responsible for causing a shortfall.

10. The system of claim 8, wherein the subscriber is configured to receive the telemetry data from the publisher, and where the NMS uses the telemetry data for network automation, traffic optimization, and troubleshooting.

11. The system of claim 1, wherein a shortfall with respect to the subscription agreement is caused by one or more changes in the distributed system, including one or more of an addition of a new publisher, an addition of a new subscriber, and an addition of a new subscription agreement.

12. The system of claim 11, wherein the shortfall with respect to the subscription agreement is further caused by one or more of an addition of a new node in the distributed system, additional resources to be monitored, software or firmware changes, a new service or microservice in the distributed system, and the status of traffic channel conditions.

13. The system of claim 1, wherein determining the shortfall includes:
   calculating an arithmetic expression based on a measured time interval between consecutive publishing events and an agreed-upon time interval of the subscription agreement, and
   determining when the arithmetic expression exceeds a benchmark value.

14. The system of claim 1, wherein the one or more recovery processes include a modification of the subscription agreement, to remedy the shortfall, and
   wherein the modification includes one or more of increasing the agreed-upon time interval, and changing priority settings with respect to one or more publishers and/or one or more subscribers.

15. The system of claim 1, wherein the one or more recovery processes include a modification of the subscription agreement, to remedy the shortfall, and
   wherein the modification includes preventing the addition of new subscriptions until the shortfall is remedied.

16. A non-transitory computer-readable medium configured to store computer logic having instructions that, when executed, cause one or more processing devices to:
   examine measurable aspects of real-world subscription events between a publisher and a subscriber in a distributed system that is a network, wherein the real-world subscription events are telemetry data in the network streamed from the publisher to the subscriber,
   compare the measurable aspects with a subscription agreement between the publisher and the subscriber to determine if there is a shortfall with respect to the subscription agreement, and responsive to the shortfall, raising an alarm in the network and causing one or more recovery processes to address the shortfall including discontinuing one or more subscriptions that are lower priority than one associated with the shortfall.

17. The non-transitory computer-readable medium of claim 16, wherein the measurable aspects include time interval calculations between consecutive publishing events, the time interval calculations being based on timestamps recorded at each publishing event.

18. A method comprising the steps of:

examining measurable aspects of real-world subscription events between a publisher and a subscriber in a distributed system that is a network, wherein the real-world subscription events are telemetry data in the network streamed from the publisher to the subscriber, comparing the measurable aspects with a subscription agreement between the publisher and the subscriber to determine if there is a shortfall with respect to the subscription agreement, and responsive to the shortfall, raising an alarm in the network and causing one or more recovery processes to address the shortfall including discontinuing one or more subscriptions that are lower priority than one associated with the shortfall.

19. The method of claim 18, wherein the measurable aspects include time interval calculations between consecutive publishing events, the time interval calculations being based on timestamps recorded at each publishing event.

\* \* \* \* \*